(12) United States Patent
Chung et al.

(10) Patent No.: US 6,482,384 B1
(45) Date of Patent: Nov. 19, 2002

(54) METHOD FOR SYNTHESIS OF ALUMINUM NITRIDE

(75) Inventors: Shyan-Lung Chung, Tainan (TW); Chun-Nan Lin, Tainan (TW); Zheng-Xiuo Lin, Tainan (TW)

(73) Assignee: National Science Council, Taipei (TW)

( * ) Notice: Subject to any disclaimer, the term of this patent is extended or adjusted under 35 U.S.C. 154(b) by 27 days.

(21) Appl. No.: 09/712,551

(22) Filed: Nov. 14, 2000

(30) Foreign Application Priority Data

Feb. 22, 2000 (TW) .................................. 89103101 A (51) Int. Cl.$^7$ ............................................ C01B 21/072
(52) U.S. Cl. ............................................ 423/412
(58) Field of Search ...................................... 423/412

(56) References Cited

U.S. PATENT DOCUMENTS

| | | | |
|---|---|---|---|
| 5,453,407 A | 9/1995 | Chung et al. | 423/412 |
| 5,460,794 A | 10/1995 | Chung et al. | 423/412 |
| 5,649,278 A | 7/1997 | Dunmead et al. | 419/2 |
| 5,693,305 A | * 12/1997 | Revankar et al. | 423/412 |
| 5,846,508 A | 12/1998 | Chung et al. | 423/412 |
| 6,120,748 A | * 9/2000 | Kaner et al. | 423/412 |
| 6,159,439 A | * 12/2000 | Miura et al. | 423/412 |
| 6,423,287 B1 | * 7/2002 | Chung et al. | 423/412 |

* cited by examiner

Primary Examiner—Wayne A. Langel
(74) Attorney, Agent, or Firm—Jackson Walker L.L.P.

(57) ABSTRACT

This invention provides a method for production of AlN powder. An Al powder was poured into a refractory container having an opening end. If the packing density of the Al powder was less than 0.8 g/cm$^3$, the container containing the Al powder was placed in a reaction chamber filled with nitrogen. If the packing density was larger than 0.8 g/cm$^3$, porous aluminum tubes were placed vertically in Al powder or an initiator was placed on top of the Al powder or both were taken. The container was then placed in the reaction chamber filled with nitrogen. A nitrogen stream was allowed to flow through the Al powder from the bottom to the top and the combustion synthesis reaction was ignited by heating the top surface of the reactant powder.

33 Claims, 7 Drawing Sheets

METHOD FOR SYNTHESIS OF ALUMINUM NITRIDE

FIELD OF THE INVENTION

The present invention relates generally to a method for preparing aluminum nitride (AlN), and more particularly to a combustion synthesis method for preparing the powdery aluminum nitride.

BACKGROUND OF THE INVENTION

Having a high thermal conductivity, a high electrical resistivity, a good mechanical strength, and a good oxidation and thermal-shock resistance, AlN becomes a very important ceramic material in industrial applications. It can be used for high-performance electronic substrate material, optical lenses, cutting tools, heat sinks, and many high-temperature structure materials.

The manufacturing methods for AlN include:

1) the gas phase reaction method, e.g.,

$$AlCl_3 + NH_3 \xrightarrow{1000-1800K} AlN + 3HCl$$

2) the direct nitridation method, e.g., $$2Al + N_2 \xrightarrow{>1200K} 2AlN$$

3) the carbothermal reduction-nitridation method, e.g., $$Al_2O_3 + N_2\ 3C \xrightarrow{1300-2000K} 2AlN + 3CO$$

4) the combustion synthesis method.

The gas reaction method is not suitable for mass production of AlN in industry because of the high cost and low productivity involved.

The direct nitridation of Al and the carbothermal reduction-nitridation of powdery $Al_2O_3$ methods in commercial form require a process executed under a high temperature and a long period of time, e.g., 5 hours, to fully complete the reaction, which can thus result in common disadvantages including a greater energy consumption and a slow manufacturing rate.

In comparison with other methods, the combustion synthesis method is a new method used to synthesize ceramic materials by self-propagation combustion reactions. The advantages achieved thereby include that it has a fast reaction rate, a less energy consumption and a simple manufacturing process and that it can be used for mass production.

Prior arts for the synthesis of aluminum nitride by the combustion synthesis method are described hereinbelow:

(1) Japan Patent Application Laid-Open No. 63-274605

Mix aluminum, aluminum nitride, and one powder selected from the group consisting of calcium carbonate ($CaCO_3$), calcium nitrate ($Ca(NO_3)_2$), yttrium oxide ($Y_2O_3$), barium carbonate ($BaCO_3$), barium nitrate ($Ba(NO_3)_2$), yttrium nitrate ($Y(NO_3)_3$), cerium oxide ($CeO_2$), and yttrium oxalate hydrate ($Y_2(C_2O_4)_2 \cdot 8H_2O$), according to an appropriate proportion, and then press the mixture into a suitable shape. Burn the cake by using an electric plate in a nitrogen atmosphere at 50 atm to form an aluminum nitride powder.

(2) Japan Patent Application Laid-Open No. 64-76906

Mix aluminum with aluminum nitride according to an appropriate ratio to be loaded in a porous refractory container. The assembly is heated by using an electric wire to form an aluminum nitride powder.

(3) Japan Patent Application Laid-Open No. 64-76905

Powders of aluminum and sodium nitride ($NaN_3$) or other nitrogen-containing solid compound (such as potassium nitride ($KN_3$), barium nitride ($Ba_3N_2$), etc.) are mixed according to an appropriate ratio and then placed in a refractory container. An igniting agent is placed on the powder mixture, and the refractory container is then placed into an electric oven which will be soon filled with nitrogen gas at a pressure of 10 $kg/cm^2$. Prior to the igniting the reaction, the reactants are heated in the electric oven and then ignited with an electric wire to carry out the combustion reaction and form an aluminum nitride powder.

(4) U.S. Pat. No. 5,460,794

An aluminum powder and a solid nitrogen-containing compound are used as the raw material and molded after mixing. The blank is fully wrapped with an igniting agent and placed in an enclosed container filled with nitrogen which is ignited by heating the igniting agent with heating elements to form an aluminum nitride powder.

(5) U.S. Pat. No. 5,453,407

An aluminum powder and a solid-state nitrogen source are used as the raw material which is added with an ammonium halide powder. The mixture of the three is molded and fully wrapped with an igniting agent. The blank is placed in an enclosed container filled with nitrogen which is ignited by heating the compact by passing an electric current through the heating coil to form an aluminum nitride powder.

(6) U.S. Pat. No. 5,846,508

An aluminum powder and an ammonium halide salt are used as the raw material which are molded into a tablet or placed in an open or porous refractory container and then placed in an enclosed container filled with nitrogen. The combustion reaction is ignited to form an aluminum nitride powder.

(7) U.S. Pat. No. 5,649,278

An aluminum powder is used as a reactant and diluted with 20–80 wt % (based on the total weight of the aluminum powder and the aluminum nitride powder) of an aluminum nitride powder. The resultant mixture is poured into a graphite crucible or a refractory container made of oxide, ceramic, etc. The powder mixture has a bulk density of from 0.5–1.5 $g/cm^3$. The container is placed in a reactor filled with nitrogen at 0.75–30 atm and the combustion reaction is ignited by directly heating the powder to form an aluminum nitride powder.

The key factors of synthesizing the aluminum nitride powder by combustion reaction are: (1) how to provide a sufficient amount of nitrogen; (2) how to prevent agglomeration of molten aluminum powder; and (3) how to achieve a complete reaction.

If a nitrogen gas is used as the nitrogen source, according to M. Costantino and C. Firpo. (J. Mater. Res. 6 : 2397 (1991)), the pressure needs to be upto 1000 atmosphere before the reaction can take place. The process used in the above-mentioned JP Laid-Open No. 63-274605 uses a pressure of 50 atm which is rather high and will cause an increase in the costs in facilities and operation thereby increasing the complexity and danger in the operation thereof.

If liquid nitrogen is used as the nitrogen source (as mentioned in the above JP 64-76906) without the need of using high pressure, the cost and the complexity of operation of the facilities will be increased because the boiling point of the liquid nitrogen is too low.

If a solid-sate nitrogen source is used as the nitrogen source (such as the above-mentioned JP 64-76905, U.S. Pat. No. 5,460,794 and U.S. Pat. No. 5,453,407), even without the use of high pressure, said solid-state nitrogen source needs to be a compound that is easily thermally decomposable for the combustion reaction to advance. Under such a circumstance, the reaction setup needs to be designed properly (such as wrapped with an igniting agent) so that the nitrogen gas generated by the thermal decomposition of the solid nitrogen source can promptly react with the aluminum powder. Otherwise, the escape of nitrogen gas will occur and hinder the performance of the reaction.

If an ammonium halide salt is added into the aluminum powder (e.g. the above-mentioned U.S. Pat. No. 5,846,508), the reaction process will generate by-products such as HCl, $NH_3$, $NH_4Cl$, $H_2$ or $Cl_2$, etc., and increase the complexity and operation costs of the downstream processes even though a high yield can be achieved at a low nitrogen pressure.

If the aluminum powder is added with a diluent such as aluminum nitride, etc. and the density of the mixture powder is 0.5–1.5 g/cm$^3$ (such as mentioned in U.S. Pat. No. 5,649,278), the process requires a homogeneous mixing of the aluminum powder and the aluminum nitride and the content of the diluent needs to be upto 30 wt % even though said process can prevent the agglomeration of the aluminum powder, maintain a proper circulation of the nitrogen gas, and reach a high conversion rate. Such a process also has a high complexity, a high operation cost, and a reduced production efficiency (based on the amount of the aluminum nitride that can be synthesized by the feed per unit weight). Furthermore, the density of the powdered feed needs to be 0.5–1.5 g/cm$^3$, which is not suitable for a packing density higher than (>1.5 g/cm$^3$) or lower than (<0.5 g/cm$^3$) of the aluminum powder (and the aluminum nitride powder), and limits the selection scope of the raw material.

SUMMARY OF THE INVENTION

The present invention provides an efficient new technology to synthesize an aluminum nitride of excellent properties by making improvements to the conventional combustion synthesis methods.

To achieve the above objective, a process for preparing an aluminum nitride according to the present invention comprises the following steps:

(a) loading a refractory container having an opening with an aluminum-containing raw material powder having a packing density of from 0.1 to 1.6 g/cm$^3$; carrying out either one or both of the following Step (a-1) and Step (a-2) if the packing density of the raw material powder is higher than 0.8 g/cm$^3$; optionally carrying out Step (a-1) or Step (a-2) if the packing density of the raw material powder is not higher than 0.8 g/cm$^3$:

(a-1) vertically disposing one or plural aluminum pipes with perforations on the pipe wall thereof in said raw material powder in said refractory container;

(a-2) placing a layer of an initiator on top of the raw material powder in said refractory container, said initiator comprising an aluminum powder and an additive capable of preventing agglomeration of molten aluminum powder;

(b) placing said loaded refractory container in a nitrogen atmosphere;

(c) introducing nitrogen gas into said loaded refractory container through a bottom or a side near the bottom of said loaded refractory container, so that the introduced nitrogen gas can flow through the raw material powder and out of the loaded refractory container through the opening thereof; and (d) heating the raw material powder or the initiator in the loaded refractory container until a self-combustion of the raw material powder or the initiator is brought about.

The invented process optionally comprises the following steps:

(e) after cooling, grinding the combustion product generated in Step (d) into a powder.

The raw material powder of Step (a) can be a pure aluminum powder, an aluminum-containing alloy powder, a mixture of a pure aluminum powder and other elements, scraps of aluminum which are generated in fabrication of aluminum products, or scraps of aluminum alloy which are generated in fabrication of aluminum alloy products. Preferably, the aluminum-content of the raw material powder which is not pure aluminum powder is higher than 50% by weight. When the purity of aluminum is higher, the purity of the AlN product will be higher. The products will be composites composed of AlN, compounds formed of nitrogen and impurities, and residual impurities, when the purity of aluminum is lower,.

The refractory container of Step (a) can be a graphite crucible, or a crucible made of ceramics of AlN, $Si_3N_4$, $Al_2O_3$, $ZrO_2$, WC, etc. The packing density of the raw material powder can be calculated by the weight and volume of the raw material powder measured in the blank experiment conducted in advance. The aluminum pipe having perforations in Step (a-1) can be an aluminum pipe which is made integrally to have holes on its wall, a perforated aluminum pipe, an aluminum pipe having perforations formed by wrapping one layer of punched aluminum foil, or an aluminum pipe having perforations formed by wrapping one or several layers of aluminum foils and punching with holes thereon. The height of the aluminum pipe is determined by the height of the raw material powder loaded. That is, one end of the aluminum pipe can be placed on the bottom of the crucible; while the other end just juts out from the top of the raw material powder loaded. The inside diameter of the aluminum pipe can be ranged from 1 mm to half of the inside diameter of the crucible, preferably 2–5 mm. The wall thickness of the aluminum pipe can be 0.01 to 0.5 mm, preferably 0.05 to 0.2 mm. The aluminum pipe should have a wall thickness, in principle, so that the pipe will not be crashed and will remain as a gas tunnel after the raw material powder is loaded, and thus it can be completely burned into aluminum nitride powder. The perforations may have a diameter ranging from 0.001 to 0.3 mm, preferably 0.02 to 0.2 mm. The density of the perforations on the aluminum pipe wall can be 1–50%, preferably 5–30%, of the total surface area of the aluminum pipe having no perforation. The number of aluminum pipes should be such that the total cross-sectional area of the aluminum pipes is 1 to 50%, preferably 5 to 20%, of the cross-sectional area of the crucible.

The initiator of Step (a-2) can be a mixture powder of an aluminum powder and an additive. Said additive can be selected from any group of the following four groups (one compound or a mixture of more compounds in the same group) or a mixture of compounds from more than one groups (more than one compounds can be selected from the same group): (i) ammonium halide, i.e. $NH_4F$, $NH_4Cl$, $NH_4Br$ and $NH_4I$; (ii) $NH_x$— or halogen-containing compounds degradable or gasifiable below the melting point (660° C.) of aluminum, e.g. urea $[CO(NH_2)_2]$, $NH_2CO_2NH_4$, ammonium carbonate [$(NH_4)_2CO_3$], $NH_4HCO_3$, $HCOONH_4$, $N_2H_4 \cdot HCl$, $N_2H_4 \cdot HBr$, $N_2H_4 \cdot 2HCl$, aluminum chloride ($AlCl_3$), aluminum bromide ($AlBr_3$) and ferric chloride ($FeCl_3$) etc.; (iii) aluminum nitride powder; (iv) other powders with a high melting point, e.g. carbon powder, BN, TiN, SiC, $Si_3N_4$ etc. The additive is 0.01 to 100% by weight of the initiator, preferably 0.05 to 60%. The layer of the initiator is 1~10 mm on top of the raw material powder, preferably 2~5 mm.

Preferably, the nitrogen atmosphere in Step (b) is formed by vacuuming an airtight chamber and introducing nitrogen gas into the vacuumed chamber, wherein a loaded refractory container is placed in said airtight chamber in advance. Said airtight chamber can be a reactor capable of withstanding a high pressure. The pressure of nitrogen gas in said airtight chamber after introducing nitrogen gas can be 0.1 to 30 atm, preferably 0.5 to 5 atm.

The nitrogen gas in Step (c) is introduced through a nitrogen-conveying pipe connected to a hole formed on the bottom, or the side and near the bottom of the refractory container. Preferably, the refractory container is provided with a gas chamber at the bottom thereof, and the gas chamber has a porous top on which the raw material powder is loaded. When carrying out Step (a-1), the lower end of said perforated aluminum pipes stand on said porous plate. The nitrogen gas introduced first flows into said gas chamber, through said porous plate, upwards through said raw material powder, and out from the top surface thereof, such that the nitrogen gas can uniformly flow through the cross-section of said raw material powder. The porous plate of said gas chamber can be made of graphite or ceramics of AlN, $Si_3N_4$, $Al_2O_3$, $ZrO_2$, WC, etc.

Under certain operation conditions, the product obtained from the reaction will adhere to the wall of the refractory container and is difficult to be removed. Therefore, a layer of aluminum nitride powder can be placed between the raw material powder and the container inner wall while loading said raw material powder.

The reactants can be ignited by using an electric heater made of tungsten filament, tungsten tape, graphite tape or plate, wherein the electric heater is moved closer to the top surface of said raw material powder or the initiator layer. Alternatively, the top surface of said raw material or said initiator is irradiated by a laser, microwave or infrared beam. In fact, any means which can heat the top surface of said raw material powder or the initiator layer to 700 to 1600° C. are all applicable in the present invention.

The shape of the aluminum nitride powder (morphology, i.e. size and shape of the particles, etc.) produced according to the method of the present invention varies with the combustion temperature. Therefore, the combustion temperature can be used to control the shape of the particles. The control of the combustion temperature can be carried out by simply adding an appropriate amount of the diluent in the raw material powder in Step (a). The amount of addition can be 0.01~60% of the total weight of the raw material powder and the diluent, where the diluent can be a ceramic powder of AlN, $Si_3N_4$, TiN, BN, SiC, $Al_2O_3$, $ZrO_2$, $TiO_2$, $SiO_2$ etc. If AlN is used as the diluent, the product is a pure AlN; while if added with other ceramic powder as the diluent, the product is a composite material of AlN and the diluent.

The particle shape and porosity of the aluminum nitride powder according to the present invention can be controlled by the addition of an expanding agent. The expanding agent itself or its gasification or decomposition under heating can increase the porosity of the raw material powder. Said expanding agent can be selected from any group of the following three groups (one material or a mixture of more materials in the same group) or a mixture of materials from more than one groups (more than one materials can be selected from the same group): (I) ammonium halide, i.e. $NH_4F$, $NH_4Cl$, $NH_4Br$ and $NH_4I$; (II) $NH_x$— or halogen-containing compounds degradable or gasifiable below the melting point (660° C.) of aluminum, e.g. urea [$CO(NH_2)_2$], $NH_2CO_2NH_4$, ammonium carbonate [$(NH_4)_2CO_3$], $NH_4HCO_3$, $HCOONH_4$, $N_2H_4 \cdot HCl$, $N_2H_4 \cdot HBr$, $N_2H_42Cl$, aluminum chloride ($AlCl_3$), aluminum bromide ($AlBr_3$) and ferric chloride ($FeCl_3$) etc.; and (III) aluminum foil balls of about 0.1 to 2 mm in size formed by wrapping a small piece of aluminum foil. The amount of the expanding agent is 0.01~10% of the total weight of said aluminum powder and said expanding agent.

The characteristic peaks of aluminum can not be observed in the XRD (X-ray diffraction) analysis of the product synthesized according to the present invention. Trace amount of the residual aluminum can be removed from the product synthesized according to the present invention by acid cleaning. The type and quantity of the impurities contained in the product depend on the aluminum content of the raw material powder and the purity thereof. Since the high combustion temperature tends to remove the volatile impurities, the amount of impurities contained in the product is usually lower than the amount of the original impurities contained in the raw material powder. In an example of the present invention, the combustion product was poured into an acid solution (an aqueous solution containing 8% by weight of HCl and 1% by weight of HF) to dissolve the residual aluminum after grinding; filtered, cleaned with a deionized water and dried to obtain the aluminum nitride product. There should have a small amount of aluminum nitride lost during the acid washing process. However, the extent of such a loss is difficult to assess. Hence, the difference between the weight of the product before the acid washing and the weight of the aluminum nitride product obtained is considered as the content of un-reacted aluminum in the combustion product. In the present invention, the term "yield" is defined as the weight of aluminum in the synthesized aluminum nitride product divided by the weight of aluminum in the raw material powder including, if any, an aluminum nitride powder added as a diluent. Under most operating conditions, the yield of the method of the present invention is higher than 95%. The products mostly are mainly in the form of particles, while rod-like, branch-like, or fibrous forms may also occur. The products synthesized under most operating conditions of the method of the present invention, are nearly all in the form of powder less than 20 $\mu$m in size after being ground with a planetary mill (at 400 rpm, for 20 min, with grinding balls made of aluminum oxide). The products are in white, maize or yellow, and are all AlN from an XRD analysis.

In the method of the present invention, if Step (a-1) or Step (a-2) is not carried out when the packing density of the raw material powder is higher than 0.8 g/cm³, the combustion reaction may still be able to undergo. However, the yield is always not high, i.e lower than 95%, and inversely proportional to the packing density of the raw material powder. The combustion reaction can not be ignited, if the packing density of the raw material powder is too high. On the other hand, if Step (a-1) or Step (a-2) are adopted when the packing density of the raw material powder is lower than 0.8 g/cm³, the yield is equally high as the one without adopting Step (a-1) or Step (a-2) (higher than 95%, and higher than 98% under most circumstances).

The major differences between the process according to the present invention and the conventional processes in synthesizing a powder of aluminum nitride by a combustion synthesis method are:

(1) The Introduction of Nitrogen Gas During the Reaction and Allowing the Nitrogen Gas to Flow Through the Raw Material Powder:

When the technique according to the present invention is used to produce aluminum nitride, during the reaction stage, a nitrogen gas is constantly introduced into the reaction system, and flows through the raw material powder uniformly. The functions provided by this are: (1) fully supplying the nitrogen required for forming nitride; (2) maintaining the raw material powder at a loosened state and preventing the agglomeration of the molten raw material powder; (3) when the combustion wave is propagating downwards from the top surface of the raw material powder, the raw material powder located below the combustion wave will first form aluminum nitride on the outer surface thereof due to a sufficient supply of nitrogen gas and the heating of the combustion wave, where the formation of such an aluminum nitride layer can prevent the agglomeration of the molten raw material powder, thereby enabling the nitrogen gas to be fully supplied to different parts of the reactants so that a complete reaction can be achieved.

(2) The Use of a Porous Aluminum Pipe and/or an Initiator for a Raw Material Powder with a High Packing Density:

If the packing density of the raw material powder is higher than 0.8 g/cm$^3$, the combustion reaction is not easily ignited, due to a poor gas flowing homogeneously through the raw material powder, thereby causing a lower product yield. Under such a circumstance, the problems can be resolved by (1) vertically disposing perforated aluminum pipes in the raw material powder; and/or (2) disposing a layer of an initiator on top of the raw material powder. The perforated aluminum pipes can assist the flow of the nitrogen gas. The additives in the initiator can prevent the agglomeration of the molten raw material powder. Therefore, a constant flow of the nitrogen gas can be maintained and a high conversion rate can be achieved.

(3) Without the Need of Adding a Diluent or an Additive Into the Raw Material Powder:

If the packing density of the raw material powder is lower than 0.8 g/cm$^3$ and pure aluminum powder is used as the raw material powder, an extremely high conversion rate (>95%) can be reached without the need of adding an ammonium halide salt as disclosed in U.S. Pat. No. 5,846,508, as well as without the need of adding an aluminum nitride powder as stated in U.S. Pat. No. 5,649,278. Furthermore, if the packing density of the raw material powder is higher than 0.8 g/cm$^3$, an extremely high conversion rate (>95%) can still be reached without the need of adding any additive or diluent by adopting the perforated aluminum pipes or the initiator layer as mentioned hereinbefore. The present invention, however, does not preclude the possibility of adding any additive or diluent mentioned for the sake of controlling the combustion temperature.

(4) Wide Range in the Applicable Types of the Raw Material Powder and the Packing Density:

A wide variety of the types of the raw material powder, including dense particles, porous particles, fluffy particles, globular particles, irregular particles, pellet-like, flake type, etc., are applicable as the reactant of the present invention. The packing density of the aluminum powder can range from 0.1 to 1.6 g/cm$^3$ in the present invention without the restriction that the density of the reactants needs to be within 0.5 to 1.5 g/cm$^3$ as disclosed in U.S. Pat. No. 5,649,278.

DETAILED DESCRIPTION OF PREFERRED EMBODIMENTS OF THE INVENTION

Figure 1:
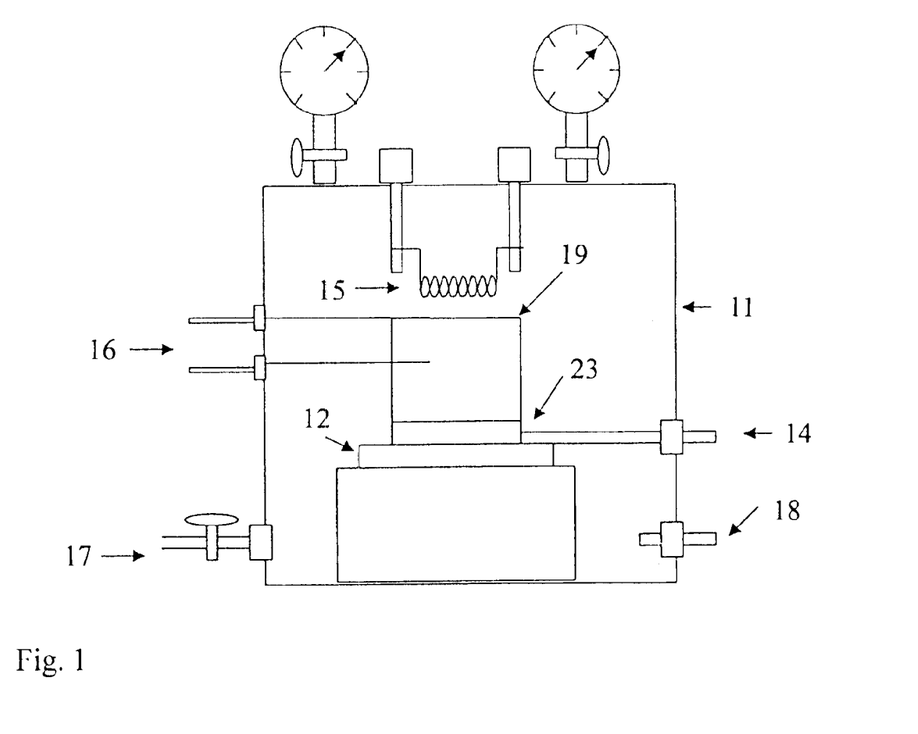
FIG. 1 is a schematic diagram showing an apparatus suitable for performing the combustion synthesis reaction according to the present invention.
Figure 2:
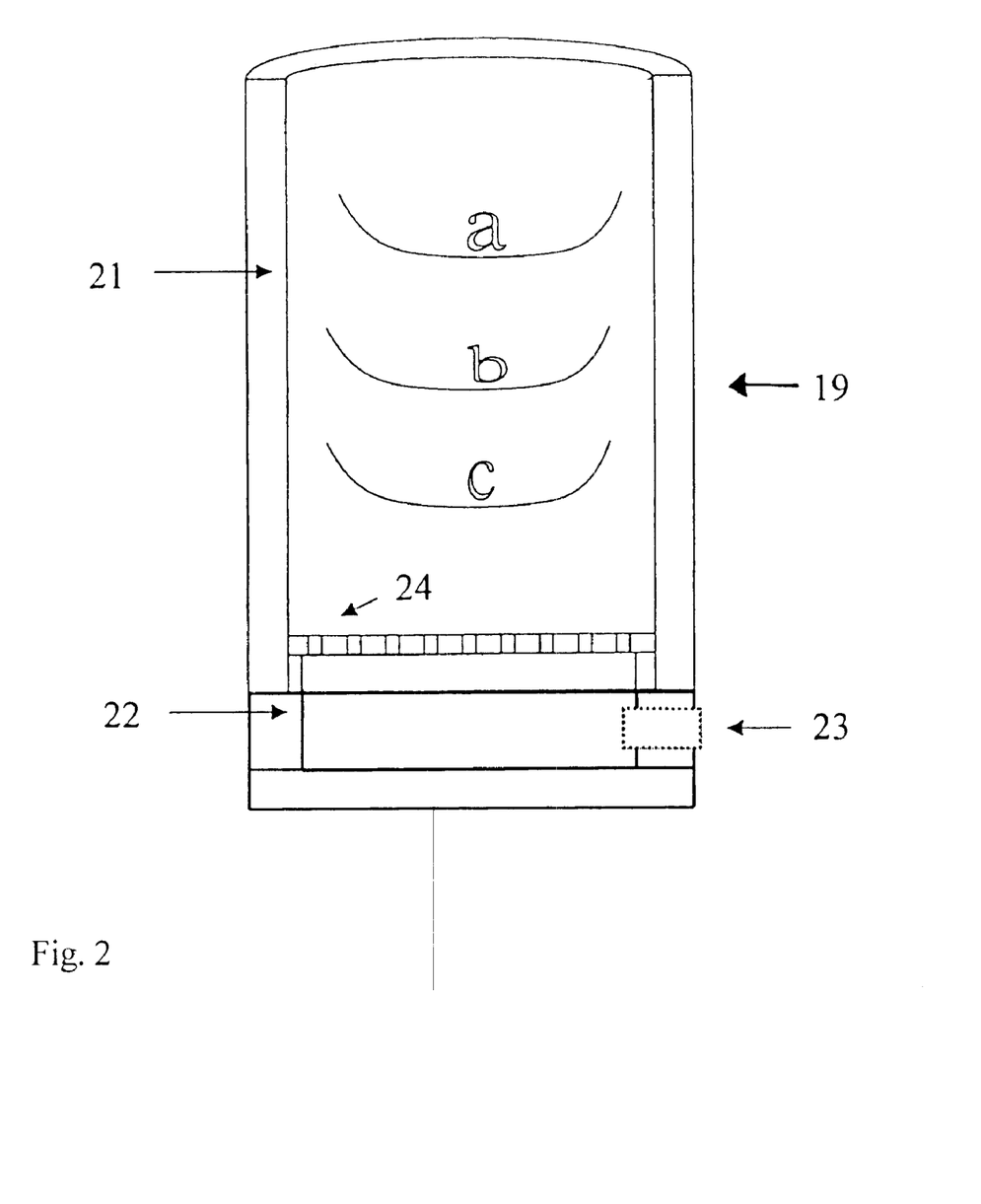
FIG. 2 is a schematic diagram showing a graphite crucible and the propagation of combustion wave during the reaction for performing the combustion synthesis reaction according to the present invention.

A graphite crucible 19 having an inside diameter of 5.4 cm and a height of 10 cm was used, as shown in FIG. 2. Said graphite crucible 19 is divided into an upper and a lower sections by a porous graphite plate 24, wherein the upper section 21 has a height of 8 cm and is used for loading the reactants, and the lower section has a height of 2 cm and is used as a gas chamber 22 for introducing nitrogen gas. A nitrogen connection hole 23 is provided on a side of the gas chamber 22. The graphite crucible 19 was loaded with 92 g of aluminum powder (flake type, average diameter $D_{50} \cong 20$ μm, purity 99%, oxygen content 0.5%) with a packing density of about 0.5 g/cm$^3$. The loaded graphite crucible 19 was placed on a refractory flat plate 12 in a pressure-withstanding reactor 11, as shown in FIG. 1. The outlet 23 at the side and near the bottom of the graphite crucible 19 was connected with a nitrogen pipe 14. A tungsten filament 15 as a heater was mounted about 3 mm from the top of the aluminum powder. A thermocouple 16 was used to monitor the ignition temperature and the variation of temperature of the aluminum powder during the combustion process.

Next, a vacuum exhaust system 17 was used to generate a vacuum to 0.1 torr in the pressure-withstanding reactor 11. Subsequently, the reactor 11 was filled with nitrogen gas to 200 torr through an inlet pipe 18. The abovementioned vacuum-nitrogen filling cycle was repeated twice in order to remove the air originally in the pressure-withstanding reactor 11, while applying a degassing and drying treatment on the raw material powder. Next, the pressure-withstanding reactor 11 was filled with a high purity nitrogen gas (99.99%) to about 1.1 atm. Then, a valve of a flow meter was opened to control the nitrogen flow at 15 l/min so that the nitrogen gas flowed into the gas chamber 22 through the nitrogen pipe 14, and upwardly flowed through the aluminum powder through the porous graphite plate 24. The power supply to the tungsten filament 15 was turned on and the heating power was controlled at 1200W to ignite the combustion reaction for about 40 seconds, wherein the ignition temperature is about 1400° C.

As shown in FIG. 2, when the tungsten filament 15 of FIG. 1 was heating the top surface of the aluminum powder, heat propagated downwardly from the top, e.g. from the alphabet "a" part to the alphebat "b" part, and then to the alphabet "c" part. Meanwhile, the nitrogen gas flowed upwardly from the bottom and through the aluminum powder; and the combustion wave, like the propagation of heat, propagates downwardly from the top. Upon completion of the reaction, the aluminum powder in the crucible 19 was converted into aluminum nitride. About 10 minutes after completion of the reaction, the product would cool to an appropriate temperature. A release valve was opened to release the pressure in the reactor to 1 atm, and then the combustion product was removed from the pressure-withstanding reactor 11. The combustion product weighs 138.8 g and contains yellow and white parts, the white part of which mainly is granular or branch-like with an average particle diameter less than 10 μm observed by using an electronic microscope, the yellow part of which is branch-like, fibrous, granular and a small amount in sintered state. A planetary mill (400 rpm, grinding time 20 min, alumina grinding balls) was used to grind the combustion product to obtain a powder with particle size less than 20 μm. The powder has a $D_{50}$ of 10 μm determined by a particle size analyzer, and exhibits strong and complete AlN characteristic peaks in an XRD spectrum while the Al characteristic peaks being un-detectable. The powder, after acid washing, filtering and drying, has 137.6 g in weight, and a yield of 98.5% through calculation. (A portion of AlN was lost during the acid washing, washing and filtering processes; therefore, the actual yield should be higher than 98.5%. In some experiments, the nitrogen gas would carry away a small amount of aluminum powder from the top of the crucible.) By using a nitrogen analyzer, the final product has a nitrogen content of 33.3%, and an oxygen content of 0.7%. BET specific surface area of the final product of is 2 $m^2/g$.

The present invention is further elaborated through the following examples, which are illustrative and, by no means, not restrictive to the scope of the present invention.

EXAMPLE 1 TO EXAMPLE 5

Figure 3:
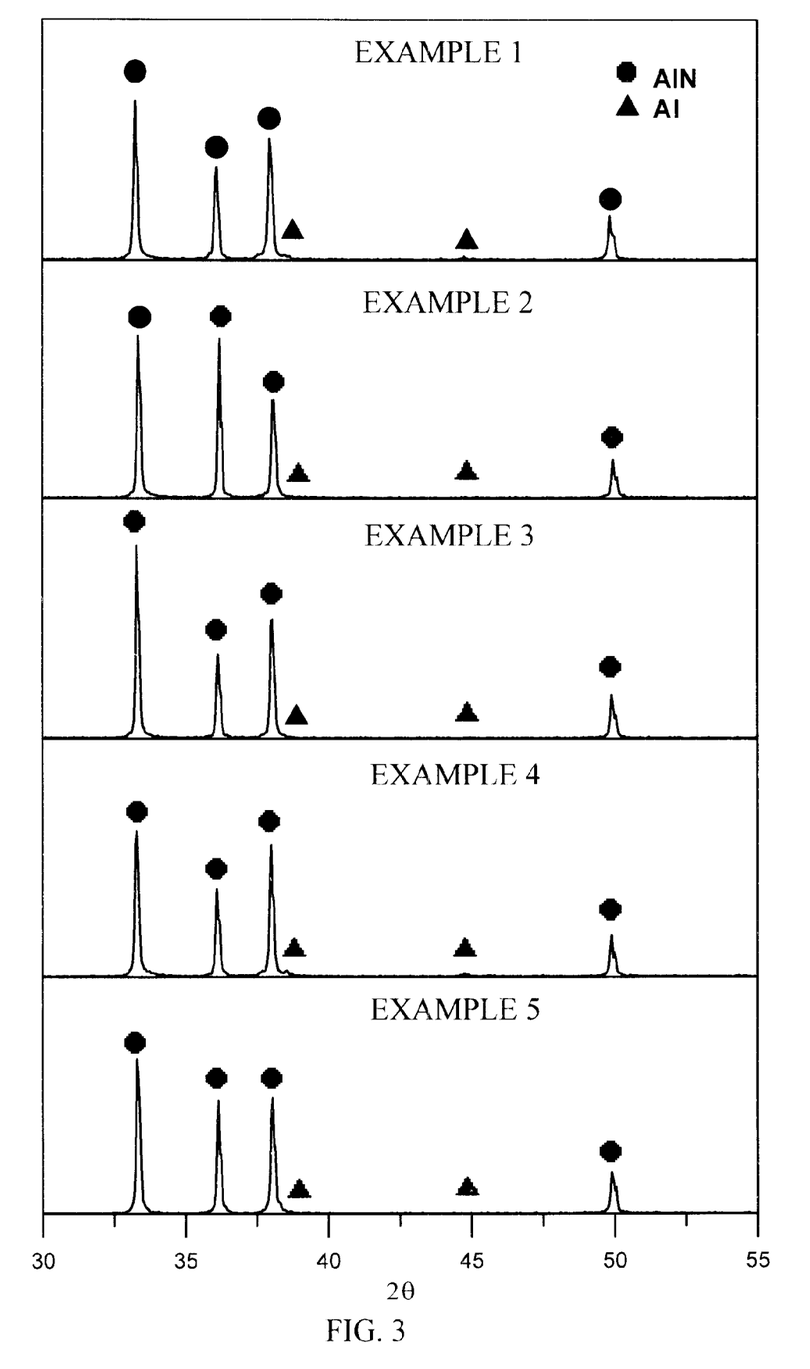
FIG. 3 shows XRD analysis spectra of the products obtained from Examples 1 to 5 according to the present invention wherein the round black dots indicate aluminum nitride (AlN), and the triangular black dots indicate aluminum (Al)

Different Types of Aluminum Powder, at Various Nitrogen Pressure, Without the Use of Diluent, Perforated Aluminum Pipe and Initiator The aluminum powder was poured into a cylindrical graphite crucible 19 with an opening at one end and a gas chamber on the other end (as shown in FIG. 2) and having a diameter of 5.4 cm and a depth of 8 cm. The crucible was placed in the pressure-withstanding reactor 11. Then, the reactor 11 was vacuumed and filled up with nitrogen gas, followed by introducing nitrogen gas into the crucible 19 from the gas chamber 22 at the bottom thereof. The tungsten filament 15 was supplied with an electric power to heat the top end of the aluminum powder until the combustion reaction was ignited. The raw material powders used in these examples include a granular aluminum powder having a purity of 99.5% and an oxygen content of 0.2%, a flake type aluminum powder having a purity of 99% and an oxygen content of 0.5%, and a porous granular aluminum powder having a purity of 99.8% and an oxygen content of 0.1%. The type and packing density of the aluminum powders, the pressure of nitrogen pressure prior to the start of the reaction, the flow rate of nitrogen gas during the reaction, the oxygen content of the product, the yield and color of the product in the examples are shown in Table 1. In the examples, the heating power was between 800 and 1600 W, the time of heating to ignition was about 20~40 seconds, the reaction time was about 2~3 minutes, wherein the pressure of nitrogen gas was inversely proportional to the reaction time. The products, after grinding, are white or maize powders which, by the XRD analysis, are AlN, as shown in FIG. 3.

TABLE 1

| Ex. | Type, size ($D_{50}$) and weight of aluminum powder | Packing density (g/cm³) | $N_2$ pressure (atm) | $N_2$ flow-rate (l/min) | Oxygen content of product (wt %) | Surface configuration of product | Yield (%) | Color |
|---|---|---|---|---|---|---|---|---|
| 1 | Flake type<br>40 μm<br>56 g | 0.2–0.3 | 1 | 10 | 0.37 | (1) Porous<br>(2) Granular (D ~5 μm)<br>(3) Branch-like (D ~1 μm, Length ~60–100 μm)<br>(4) Fibrous | 98 | Maize mixture of white and yellow |
| 1 | Flake type<br>40 μm<br>56 g | 0.2–0.3 | 1 | 10 | 0.37 | (1) Porous<br>(2) Granular (D ~5 μm)<br>(3) Branch-like (D ~1 μm, Length ~60–100 μm)<br>(4) Fibrous | 98 | Maize mixture of white and yellow |
| 2 | Flake type<br>40 μm<br>58 g | 0.2–0.3 | 3 | 10 | 0.32 | (1) Porous<br>(2) Granular (D ~10 μm)<br>(3) Branch-like (D ~1 μm, Length ~60–100 μm)<br>(4) Fibrous | 99 | Mainly maize, small amount in white |
| 3 | Flake type<br>40 μm<br>92 g | 0.4–0.5 | 1 | 15 | 0.30 | (1) Porous<br>(2) Granular (D ~10 μm)<br>(3) Sintered at most top surface of the product<br>(4) Branch-like (D ~1 μm, Length ~60–100 μm) | 97 | Mainly maize, small amount in white |
| 4 | 50 wt % flake type 40 μm + 50 wt % | 0.5–0.6 | 1 | 15 | 0.31 | (1) Porous<br>(2) Granular (D ~30 um) | 96 | Mainly maize, small amount in |

TABLE 1-continued

| Ex. | Type, size ($D_{50}$) and weight of aluminum powder | Packing density (g/cm³) | $N_2$ pressure (atm) | $N_2$ flow-rate (l/min) | Oxygen content of product (wt %) | Surface configuration of product | Yield (%) | Color |
|---|---|---|---|---|---|---|---|---|
| | granular 20 μm 95 g | | | | | (3) Sintered at most top surface of the product (4) Branch-like (D ~1 μm, Length ~60–100 μm) | | white |
| 5 | Porous granular 25 μm 82 g | 0.4–0.5 | 1 | 15 | 0.35 | (1) Porous (2) Granular (D ~20 um) (3) Branch-like (D ~1 μm, Length ~60–100 μm) | 96 | Mainly maize, small amount in white |

EXAMPLES 6~12

Different Combustion Temperature

Most operation conditions of Examples 6~12 were identical to those of Example 2, with the differences listed in Table 2 and Table 3. The major differences were the use of a pre-heating of the aluminum powder or adding a diluent into the aluminum powder to increase or reduce the combustion temperature in order to alter the configuration of the product. The pre-heating of aluminum powder was carried out by winding the graphite crucible with a nickel chromate filament wrapped with an alumina pipe, supplying with an electric power, and reading the temperature of pre-heating by a thermocouple. The pre-heating of aluminum powder will cause the speed of the combustion wave to increase, and the structure of product to change. The higher the temperature of pre-heating, the combustion is more closer to a thermal explosion and the sintering of the product becomes more significant. The product, after grinding, contains white or maize powder and is AlN determined by an XRD analysis.

TABLE 2

| Ex. | Weight of aluminum powder | Temp. of pre-heating (° C.) | Flow-rate of nitrogen gas (l/min) | Oxygen content of product (wt %) | Surface configuration of product | Yield (%) | Color |
|---|---|---|---|---|---|---|---|
| 6 | 60 g | 200 | 15 | 0.33 | (1)Porous (2)Granular (D~10 μm) (3)Sintered locally (4)Branch-like (5)Fibrous | 99 | Maize, small amount in white |
| 7 | 59 g | 300 | 20 | 0.41 | (1)Porous (2)Granular (D~20 μm) (3)Sintered locally (4)Branch-like (5)Fibrous | 97 | Maize |

TABLE 2-continued

| Ex. | Weight of aluminum powder | Temp. of pre-heating (° C.) | Flow-rate of nitrogen gas (l/min) | Oxygen content of product (wt %) | Surface configuration of product | Yield (%) | Color |
|---|---|---|---|---|---|---|---|
| 8 | 57 g | 450 | 30 | 0.28 | (1)Porous (2)Granular (D~80 μm) (3)Sintered locally (4)Branch-like (5)Fibrous | 95 | Yellow |

Figure 4:
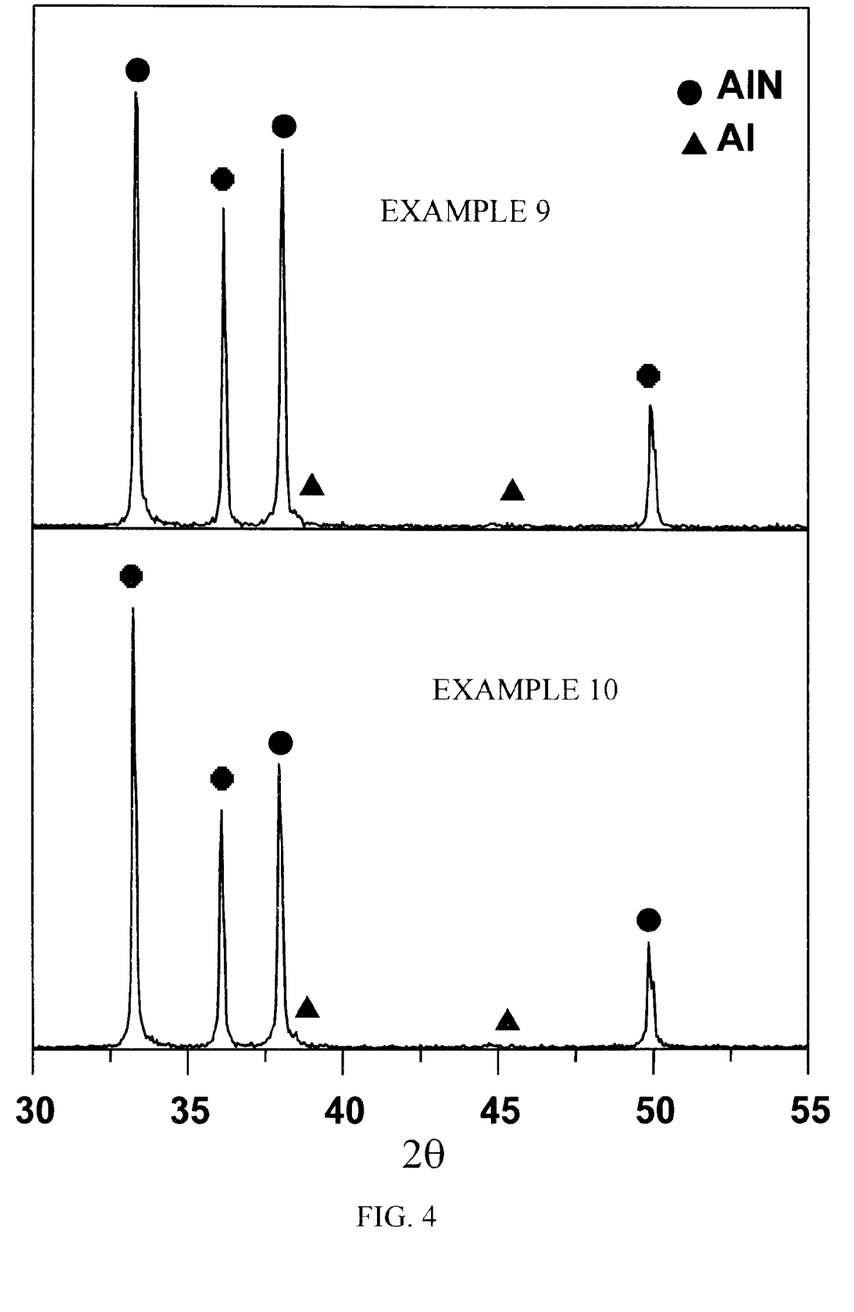
FIG. 4 shows XRD analysis spectra of the products obtained from Examples 9 to 10 according to the present invention wherein the round black dots indicate aluminum nitride (AlN), and the triangular black dots indicate aluminum (Al)
Figure 5:
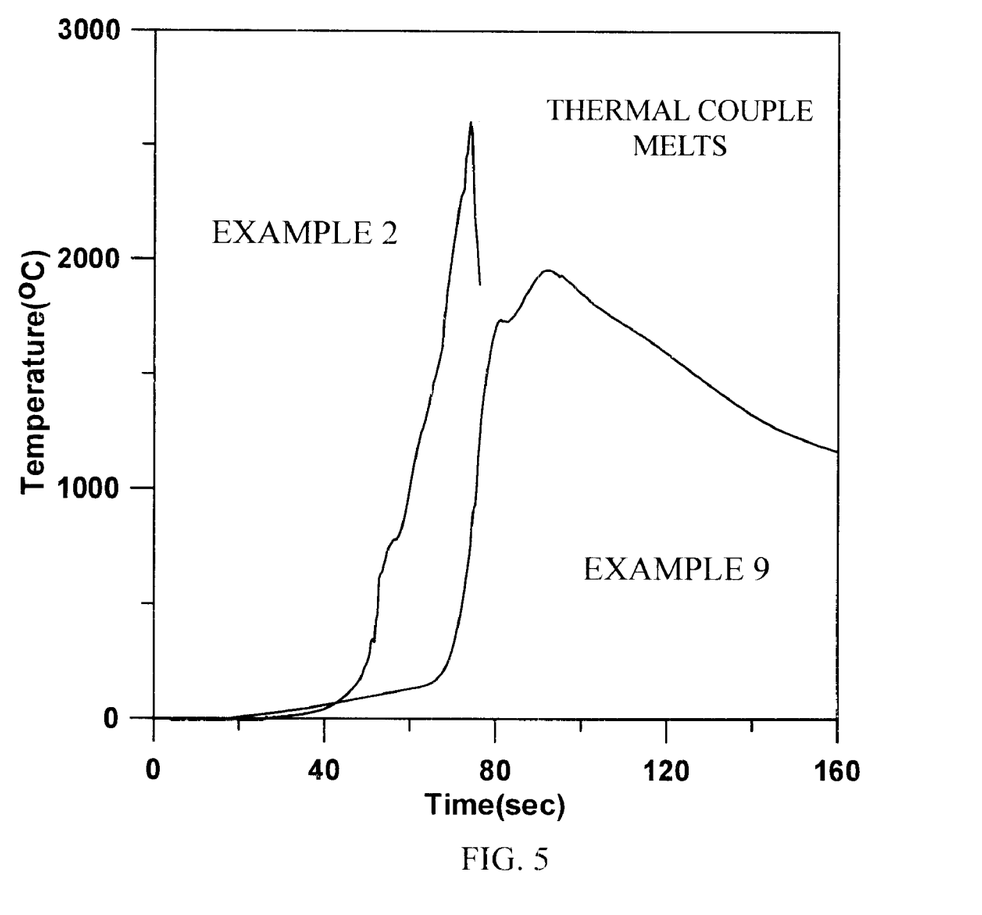
FIG. 5 is a combustion temperature versus time plot showing the temperature variation of the combustion synthesis reaction of Examples 2 and 9 according to the present invention.

In the examples where a diluent was used, the aluminum powder and the diluent powder (wherein AlN: $D_{50}$~2 μm, oxygen content~1% by weight; SiC: $D_{50}$~5 μm; $Al_2O_3$: $D_{50}$~0.1 μm) were mixed in a desired ratio, blended with a blender for 10 minutes, and poured into the graphite crucible 19 shown in FIG. 2. The time for the combustion wave reaching the bottom of the crucible from the ignition is about 3~4 minutes. The higher the content of the diluent in the reactants, the longer is the reaction time. In the examples where AlN is added, the product, after grinding, is essentially a white powder which is AlN determined by an XRD analysis, as shown in FIG. 4. In the examples where SiC and $Al_2O_3$ are added, the products are composites of AlN with SiC and $Al_2O_3$, respectively, determined by XRD analysis. The combustion temperature-versus-time curves of Example 2 and Example 9 are shown in FIG. 5. The maximum tolerable temperature of a W-type thermocouple is about 2500° C., which is inserting into the crucible for measuring the combustion temperature directly. In Examples 1–8, the thermocouple is broken after being swept through by the combustion wave, and making the combustion temperature undetectable. As a result, the combustion temperature is higher than 2500° C. in the cases where a pure aluminum powder is used or a pre-heating is carried out on the reactants. In the case where AlN (50%) is added, the combustion temperature is lower, and is about 2000° C.

TABLE 3

| Ex. | Al powder + diluent | Packing density (g/cm³) | N₂ pressure (atm) | N₂ flowrate (l/min) | Oxygen content of product (wt %) | Surface configuration of product | Yield (%) | Color or composition of product | Combustion temp. (° C.) |
|---|---|---|---|---|---|---|---|---|---|
| 9 | 50 wt % flake type aluminum powder + 50 wt % AlN powder 119 g | 0.6–0.7 | 1 | 15 | 0.75 | (1) porous (2) mainly granular (D ~5 μm) (3) branch-like (D ~1 μm, length ~5–100 μm) (4) no sintering | 98 | white | ~2000 |
| 10 | 75 wt % granular aluminum powder + 25 wt % AlN powder 174 g | 0.9–1.0 | 1 | 20 | 0.57 | (1) porous (2) mainly granular (D – 10 μm) (3) branch-like (D ~1 μm, length ~5–100 μm) (4) dense | 96 | White, small amount in maize | ~2300 |
| 11 | 50 wt % flake type aluminum powder + 50 wt % SiC powder 105 g | 0.6–0.7 | 1 | 15 | 0.3 | (1) porous (2) mainly granular (D – 5 μm) (3) branch-like (D ~1 μm, length ~5–100 μm) (4) dense | 96 | AlN + SiC | ~2000 |
| 12 | 50 wt % granular aluminum powder + 25 wt % Al₂O₃ powder 120 g | 0.8–0.9 | 2 | 15 | 19 | (1) porous (2) mainly granular (D – 10 μm) (3) branch-like (D ~1 μm, length ~5–100 μm) (4) dense | 98 | AlN + Al₂O₃ | ~2000 |

EXAMPLE 13~16

Disposing Perforated Aluminum Pipes in Aluminum Powder

Table 4 lists the operation conditions and the types of product for four examples where perforated aluminum pipes were disposed in the aluminum powder. Other operation conditions of these four examples were identical to those of Example 3. The products, after grinding, are AlN determined by XRD analyses. The perforated aluminum pipes used have an inside diameter of 5 mm, a wall thickness of 0.1 mm, a perforation size of 0.1 mm on the pipe wall. The perforations provide a passage area equal to 30% of the total surface area of the pipe wall when the pipe wall is not perforated.

Example 13 and Example 14 used three and four perforated aluminum pipes, respectively; while Example 15 and Example 16 used five and six perforated aluminum pipes, respectively. The yield of Example 15 is lower to about 90% by weight if no perforated aluminum pipe is disposed in the aluminum powder.

TABLE 4

| Ex. | Aluminum powder | Packing density (g/cm³) | N₂ pressure (atm) | Nitrogen flowrate (l/min) | Oxygen content of product (wt %) | Surface configuration of product | Yield (%) | Color |
|---|---|---|---|---|---|---|---|---|
| 13 | 50 wt % flake type + 50 wt % granular 97 g | 0.5–0.6 | 1 | 15 | 0.28 | (1) porous (2) granular (D ~15 μm) (3) branch-like (D ~1 μm, length ~1–200 μm) (4) fibrous | 98 | maize |
| 14 | Granular 174 g | 0.8–1.0 | 3 | 15 | 0.33 | (1) dense (2) granular (D ~80 μm) (3) sintered locally (4) branch-like (D ~1 μm, length ~1–200 μm) | 97 | yellow |
| 15 | Granular 228 g | 1.2–1.3 | 3 | 25 | 0.45 | (1) dense rigid blocks (2) granular (D ~80 μm) (3) sintered locally (4) branch-like (D ~1 μm, length ~1–300 μm) | 96 | yellow |
| 16 | Flake type, 40 μm 300 g | 0.53 | 1 | 100 | 0.67 | (1) porous (2) granular (D ~10 μm) (3) sintered at most top surface of product (4) branch-like (D ~1 μm, length ~60–100 μm) | 99 | yellow |

EXAMPLES 17~20

Figure 6:
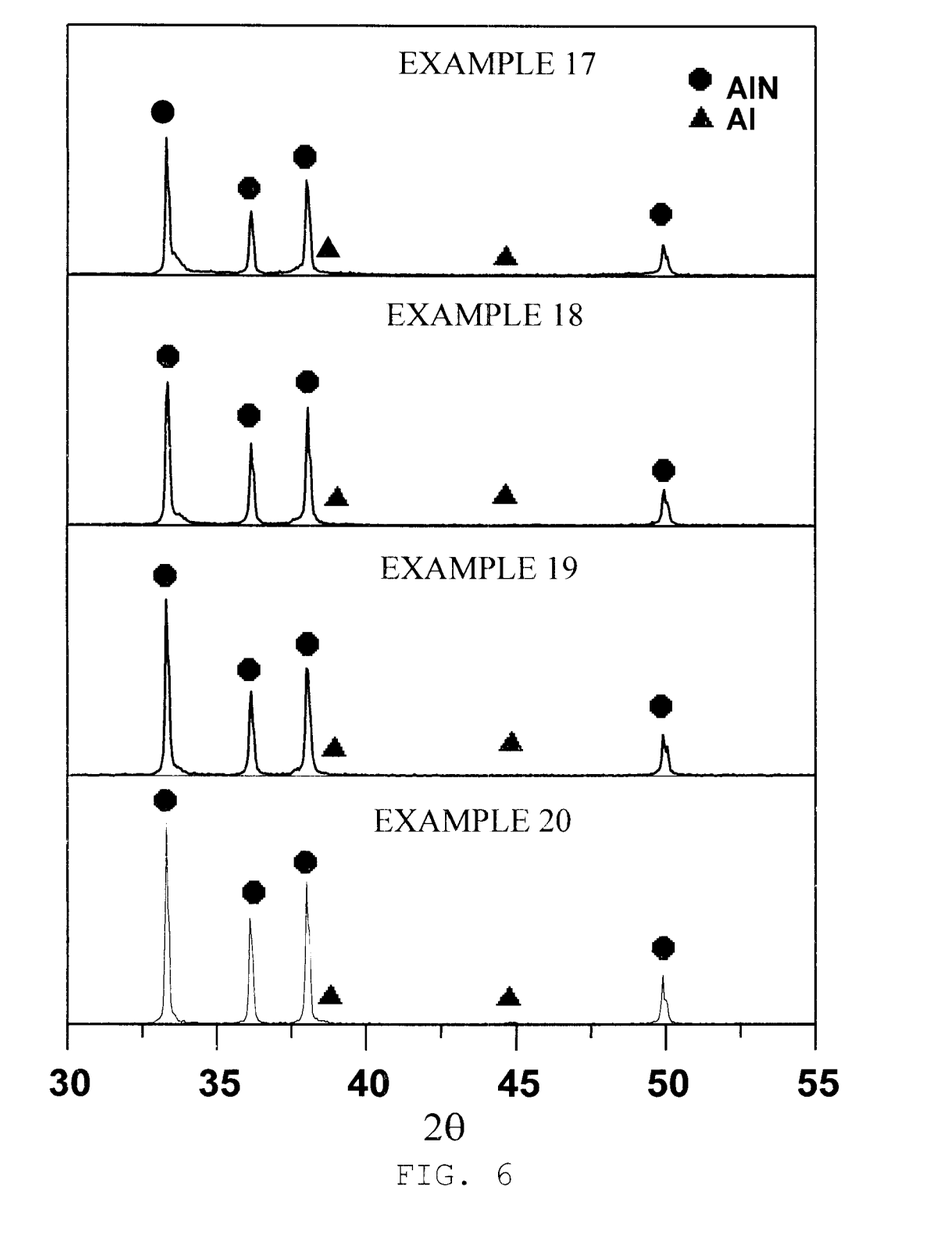
FIG. 6 shows XRD analysis spectra of the products obtained from Examples 17 to 20 according to the present invention wherein the round black dots indicate aluminum nitride (AlN), and the triangular black dots indicate aluminum (Al)

Adding Diluent AlN, Disposing Perforated Aluminum Pipes, Without the Addition of an Initiator Most of the operation conditions for Examples 17~20 are identical to those of Example 9, with the differences being listed in Table 5. The main differences are the addition of aluminum nitride into the aluminum powder, and the disposal of perforated aluminum pipes in the powder. The perforated aluminum pipes used have an inside diameter of 4 mm, a wall thickness of 0.08 mm, a perforation size of 0.15 mm on the pipe wall. The perforations provide a passage area equal to 25% of the total surface area of the pipe wall when the pipe wall is not perforated. Example 17 and Example 18 used four aluminum pipes; while Example 19 and Example 20 used five aluminum pipes. The products are all AlN determined by XRD analyses, as shown in FIG. 6.

EXAMPLES 21~24

Using Initiator, Without Perforated Aluminum Pipe

Table 6 lists the operation conditions and experimental results for four examples using an initiator. Other operation conditions are identical to those of Example 3. The initiator was prepared by mixing aluminum powder with an additive according to ratio listed in Table 6. The initiator was put on the top of the aluminum powder with a thickness shown in Table 6. The products of these examples are all AlN determined by XRD analyses.

TABLE 5

| Ex. | Al + AlN powder | Packing density (g/cm$^3$) | N$_2$ pressure (atm) | Nitrogen flowrate (l/min) | O$_2$ content of product (%) | Surface configuration of product | | Yield (%) | Color |
|---|---|---|---|---|---|---|---|---|---|
| 17 | 50 wt % granular + 50 wt % AlN powder 100 g | 0.5–0.6 | 1 | 10 | 0.72 | (1)<br>(2)<br>(3)<br>(4) | porous<br>granular (D ~10 μm)<br>branch-like<br>fibrous | 99.5 | white |
| 18 | 50 wt % granular + 50 wt % AlN powder 173 g | 0.9–1.0 | 1 | 15 | 0.51 | (1)<br>(2)<br>(3)<br>(4) | porous<br>granular (D ~10 μm)<br>branch-like<br>fibrous | 98 | White, small amount in yellow |
| 19 | 50 wt % granular + 50 wt % AlN powder 192 g | 1.0–1.1 | 1 | 25 | 0.42 | (1)<br>(2)<br>(3)<br>(4) | dense<br>granular (D ~30 μm)<br>branch-like<br>fibrous | 95 | White, small amount in yellow |
| 20 | 90 wt % granular + 10 wt % AlN powder 192 g | 1.0–1.1 | 1 | 25 | 0.31 | (1)<br>(2) | dense blocks<br>mainly sintered | 95 | Yellow, small amount in white |

TABLE 6

| Ex. | Composition of initiator | Thickness of initiator layer | Packing density of aluminum powder (g/cm$^3$) | N$_2$ pressure (atm) | N$_2$ flowrate (l/min) | O$_2$ content of product (%) | Surface configuration of product | | Yield (%) | Color |
|---|---|---|---|---|---|---|---|---|---|---|
| 21 | 98 wt % Al + 2 wt % NH$_4$Cl | 5 mm | 0.4–0.5 | 1 | 15 | 0.5 | (1)<br>(2)<br>(3) | porous<br>granular (D ~30 μm)<br>branch-like (D ~1 μm, length ~1–100 μm) | 96 | maize |
| 22 | 50 wt % Al + 50 wt % AlN | 5 mm | 0.5–0.6 | 1 | 15 | 0.4 | (1)<br>(2)<br>(3) | porous<br>granular (D ~30 μm)<br>branch-like (D ~1 m, length ~1–100 μm) | 97 | maize |
| 23 | 70 wt % Al + 30 wt % SiC | 6 mm | 0.8–1.0 | 1 | 15 | 0.5 | (1)<br>(2)<br>(3) | porous<br>granular (D ~ 30 μm)<br>branch-like (D ~1 μm, length ~1–200 μm) | 96 | maize |
| 24 | 90 wt % Al + 10 wt % CO(NH$_2$)$_2$ | 7 mm | 0.5–0.6 | 1 | 15 | 0.45 | (1)<br>(2)<br>(3) | porous<br>granular (D ~30 μm)<br>branch-like (D ~1 μm, length ~1–150 μm) | 96 | maize |

EXAMPLES 25 and 26

Disposing Perforated Aluminum Pipes and Using Initiator

Figure 7:
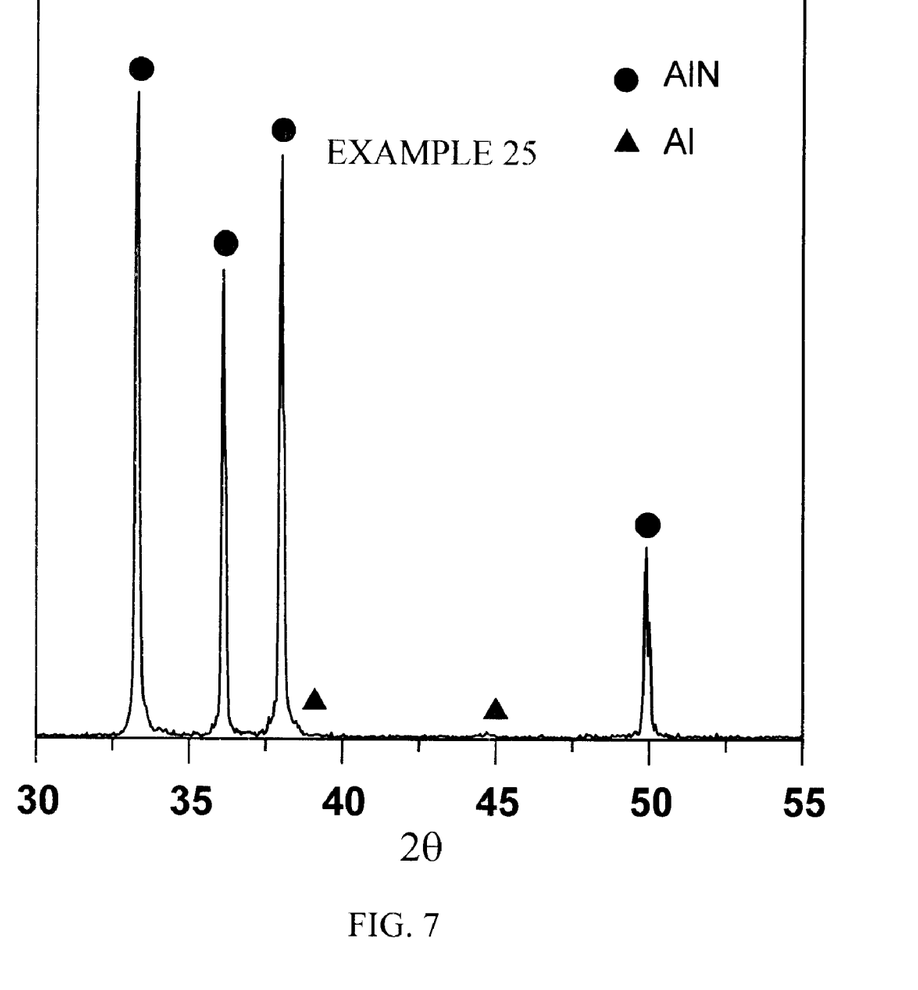
FIG. 7 shows an XRD analysis spectrum of the product obtained from Example 25 according to the present invention wherein the round black dots indicate aluminum nitride (AlN), and the triangular black dots indicate aluminum (Al).

Table 7 lists the operation conditions and experimental results for these two examples using an initiator and perforated aluminum pipes. Other operation conditions are identical to those of Example 3. The perforated aluminum pipes used in Examples 25 and 26 are identical to those used in Example 13, and the number of which are 4 and 20, respectively. The products are all AlN determined by XRD analyses, as shown in FIG. 7.

TABLE 7

| Ex. | Type, size ($D_{50}$) and weight of aluminum powder, composition and thickness of initiator | Packing density (g/cm$^3$) | $N_2$ pressure (atm) | $N_2$ flowrate (l/min) | $O_2$ content of product (%) | Surface configuration of product | Yield (%) | Color |
|---|---|---|---|---|---|---|---|---|
| 25 | Granular 20 μm 165 g Composition of initiator 99 wt % Al + 1 wt % NH$_4$Cl about 5 mm in thickness | 0.8–1.0 | 3 | 15 | 0.25 | (1) dense (D ~80 μm) (2) branch-like (D ~1 m, length ~50–250 μm) (3) flake type, longitudinal | 97 | maize |
| 26 | Flake type, 40 μm 3000 g Composition of initiator 50 wt % Al + 50 wt % AlN, about 5 mm in thickness | 0.5–0.6 | 1 | 100 | 0.35 | (1) porous (2) granular (D ~25 um) (3) branch-like (D ~1 μm, length ~60–100 μm) (4) fibrous | 99.3 | maize |

EXAMPLE 27

Most of the operation conditions used in this are identical to those of Example 4 with the difference that a layer of AlN powder was layered between the aluminum powder and the crucible (at the bottom and on the surrounding wall). The objective of such an application is to enable that the AlN product, upon completion of the reaction, can be easily removed from the crucible. The operation conditions and the reaction results are listed in Table 8.

TABLE 8

| Ex. | Type, size ($D_{50}$) and weight of aluminum powder | Packing density (g/cm$^3$) | $N_2$ pressure (atm) | $N_2$ flowrate (l/min) | $O_2$ content of product (%) | Surface configuration of product | Yield (%) | Color |
|---|---|---|---|---|---|---|---|---|
| 27 | 50 wt % flake type 40 μm + 50 wt % granular 20 μm 96 g | 0.5–0.6 | 1 | 15 | 0.46 | (1) porous (2) granular (D ~25 μm) (3) branch-like (D ~1 μm, length ~1–100 μm) (4) fibrous | 97 | maize |

Examples 28 and 29

Most of the operation conditions in these two examples are identical to those of Example 27 with the difference of using a raw material powder of different source and composition. The operation conditions and reaction results are listed in Table 9.

TABLE 9

| Ex. | Source, composition and weight of raw material powder | Packing density (g/cm$^3$) | $N_2$ pressure (atm) | $N_2$ flowrate (l/min) | Composition of product |
|---|---|---|---|---|---|
| 28 | Scraps from fabrication of aluminum alloy product | 0.6 | 1 | 15 | AlN, Mg, Mn, Si$_3$N$_4$, Fe |
| 29 | Al: 90 wt % Si: 0.7 wt % Mg: 6 wt % Fe: 0.3 wt % Mn: 3 wt % 98 g Powder mixture of aluminum powder and powder of other elements | 0.65 | 1 | 15 | AlN, TiN, Fe, C, Si$_3$N$_4$, Si |

TABLE 9-continued

| Ex. | Source, composition and weight of raw material powder | Packing density (g/cm³) | N₂ pressure (atm) | N₂ flowrate (1/min) | Composition of product |
|---|---|---|---|---|---|
| | Al: 80% C: 3% Ti: 10% Si: 2% Fe: 5% 95 g | | | | |

EXAMPLES 30 and 31

Addition of Expanding Agent Into the Raw Material Powder

A flake type aluminum powder with a packing density of 0.8 g/cm³ was used. Other operation conditions and the reaction results are listed in Table 10.

TABLE 10

| Ex. | Expanding agent | Composition and weight of raw material powder | N₂ pressure (atm) | N₂ flowrate (l/min) | O₂ content of product (%) | Surface configuration of product | Yield (%) | Color |
|---|---|---|---|---|---|---|---|---|
| 30 | Al foil ball with diameter of about 1 mm | Al powder 95 wt % + Al foil ball 5 wt % 300 g | 1.5 | 20 | 0.56 | (1) fluffy and porous (2) granular (D ~10 μm) (3) fibrous | 99 | maize |
| 31 | NH₄Cl | Al powder 99.5 wt % + NH₄Cl 0.5 wt % 1000 g | 1.5 | 100 | 0.53 | (1) fluffy and porous (2) granular (D ~8 μm) (3) fibrous | 99.5 | maize |

Although the present invention has been described with reference to specific details of certain embodiments thereof, it is not intended that such details should be regarded as limitations upon the scope of the invention except as and to the extent that they are included in the accompanying claims. Many modifications and variations are possible in light of the above disclosure.

What is claimed is:

1. A method of synthesizing an aluminum nitride, which comprises the following steps:
    (a) loading a refractory container having an opening with an aluminum-containing raw material powder having a packing density of 0.1~1.6 g/cm³; carrying out either one or both of the following Step (a-1) and Step (a-2) if the packing density of the raw material powder is higher than 0.8 g/cm³; optionally carrying out Step (a-1) or Step (a-2) if the packing density of the raw material powder is not higher than 0.8 g/cm³:
        (a-1) vertically disposing one or plural aluminum pipes with perforations on the pipe wall thereof in said raw material powder in said refractory container;
        (a-2) placing a layer of an initiator on top of the raw material powder in said refractory container, said initiator comprising an aluminum powder and an additive capable of preventing agglomeration of molten aluminum powder;
    (b) placing said loaded refractory container in a nitrogen atmosphere;
    (c) introducing nitrogen gas into said loaded refractory container through a bottom or a side near the bottom of said loaded refractory container, so that the introduced nitrogen gas can flow through the raw material powder and out of the loaded refractory container through the opening thereof; and
    (d) heating the raw material powder or the initiator in the loaded refractory container until a self-combustion of the raw material powder or the initiator is brought about.

2. The method of synthesizing aluminum nitride as claimed in claim 1 wherein the packing density of said raw material powder is higher than 0.8 g/cm³, and Step (a-1) is not carried out.

3. The method of synthesizing aluminum nitride as claimed in claim 1 wherein the packing density of said raw material powder is higher than 0.8 g/cm³, and Step (a-2) is not carried out.

4. The method of synthesizing aluminum nitride as claimed in claim 1 wherein the packing density of said raw material powder is higher than 0.8 g/cm³, and both Step (a-1) and Step (a-2) are carried out.

5. The method of synthesizing aluminum nitride as claimed in claim 1 wherein the packing density of said raw material powder is not higher than 0.8 g/cm³, and both Step (a-1) and Step (a-2) are not carried out.

6. The method of synthesizing aluminum nitride as claimed in claim 1 wherein the packing density of said raw material powder is not higher than 0.8 g/cm³, and Step (a-1) is carried out.

7. The method of synthesizing aluminum nitride as claimed in claim 1 wherein the packing density of said raw material powder is not higher than 0.8 g/cm³, and Step (a-2) is carried out.

8. The method of synthesizing aluminum nitride as claimed in claim 1 wherein the packing density of said raw material powder is not higher than 0.8 g/cm³, and both Step (a-1) and Step (a-2) are carried out.

9. The method of synthesizing aluminum nitride as claimed in claim 1 further comprising:
    (e) grinding the resulting combustion product from Step (d), after it is cool, to a powder.

10. The method of synthesizing aluminum nitride as claimed in claim 1 wherein the raw material powder is selected from the group consisting of: a substantially pure aluminum power; an aluminum alloy powder; substantially pure aluminum scraps generated during the production of aluminum products; aluminum alloy scraps generated during the production of aluminum alloy products; and a mixture powder of a substantially pure aluminum powder and other element or compound.

11. The method as claimed in claim 10 wherein said raw material powder has an aluminum content higher than 50% by weight, and an average particle size of 0.01~200 μm.

12. The method as claimed in claim 1 wherein the packing density of said raw material powder is 0.2~1.0 g/cm³.

13. The method of synthesizing aluminum nitride as claimed in claim 1 further comprising the following step before Step (d):
    (c') pre-heating said raw material powder in the refractory container without causing said raw material powder to ignite in order to increase a combustion temperature of said raw material powder, the pre-heating temperature being 50–600° C.

14. The method of synthesizing aluminum nitride as claimed in claim 13 wherein the pre-heating temperature in Step (c') is 200–400° C.

15. The method of synthesizing aluminum nitride as claimed in claim 1 wherein said raw material powder is a substantially pure aluminum powder, and has an average particle size of 0.01~200 µm.

16. The method of synthesizing aluminum nitride as claimed in claim 1 wherein said raw material powder is a mixture of a substantially pure aluminum powder and a diluent, the amount of said diluent being 0.01~60% of the total weight of said aluminum powder and said diluent, wherein the mixture has a combustion temperature lower than that of said substantially pure aluminum powder.

17. The method of synthesizing aluminum nitride as claimed in claim 16 wherein said diluent is selected from the group consisting of AlN, $Si_3N_4$, TiN, BN, SiC, $Al_2O_3$, $ZrO_2$, $TiO_2$ and $SiO_2$.

18. The method of synthesizing aluminum nitride as claimed in claim 1 wherein said raw material powder is a mixture of a substantially pure aluminum powder and a expanding agent, the amount of said expanding agent being 0.01~10% of the total weight of said aluminum powder and said expanding agent.

19. The method of synthesizing aluminum nitride as claimed in claim 18 wherein said expanding agent is one compound or a combination of two or more of the following compounds selected from the group consisting of: (I) ammonium halide; (II) a compound containing NHx or halogen and capable of being decomposed or gasified below the melting point of aluminum (660° C.), where x is an integer of 1 to 4; and (III) aluminum foil balls.

20. The method of synthesizing aluminum nitride as claimed in claim 19 wherein said ammonium halide (I) is $NH_4F$, $NH_4Cl$, $NH_4Br$ or $NH_4I$; and said compound (II) is urea [$CO(NH_2)_2$], $NH_2CO_2NH_4$, $(NH_4)_2CO_3$, $NH_4HCO_3$, $HCOONH_4$, $N_2H_4 \cdot HCl$, $N_2H_4 \cdot HBr$, $N_2H_4 \cdot 2HCl$, $AlCl_3$, $AlBr_3$ or $FeCl_3$.

21. The method of synthesizing aluminum nitride as claimed in claim 1 wherein said refractory container is made from graphite, AlN, $Si_3N_4$, $Al_2O_3$, $ZrO_2$, or WC.

22. The method of synthesizing aluminum nitride as claimed in claim 1 wherein said aluminum pipes have an inside diameter of from 1 mm to half of the inside diameter of the refractory container, and a wall thickness of 0.01~0.5 mm; wherein said perforations have diameters of 0.001~0.3 mm, and said perforations has a number such that they occupy 1~50% of a total area of a surface of said aluminum pipe when it has no perforation thereon; and wherein the aluminum pipes have a number such that a total radial cross-section of them occupy 1~50% of a radial cross-section of said refractory container.

23. The method of synthesizing aluminum nitride as claimed in claim 19 wherein said aluminum pipes have an inside diameter of 2~5 mm, and a wall thickness of 0.05~0.2 mm; and wherein said perforations have a diameter of 0.02~0.2 mm, and said perforations has a number such that they occupy 5~30% of a total area of a surface of said aluminum pipe when it has no perforation thereon; and wherein the aluminum pipes have a number such that a total radial cross-section of them occupy 5~20% of a radial cross-section of said refractory container.

24. The method of synthesizing aluminum nitride as claimed in claim 1 wherein said additive is one compound or a combination of two or more of the following compounds selected from the group consisting of: (i) ammonium halide; (ii) a compound containing NHx or halogen and capable of being decomposed or gasified below the melting point of aluminum (660° C.), where x is an integer of 1 to 4; (iii) aluminum nitride powder; and (iv) another powder with a melting point higher than that of Al.

25. The method of synthesizing aluminum nitride as claimed in claim 24 wherein said ammonium halide (i) is $NH_4F$, $NH_4Cl$, $NH_4Br$ or $NH_4I$; said compound (ii) is urea [$CO(NH_2)_2$], $NH_2CO_2NH_4$, $(NH_4)_2CO_3$, $NH_4HCO_3$, $HCOONH_4$, $N_2H_4 \cdot HCl$, $N_2H_4 \cdot HBr$, $N_2H_4 \cdot 2HCl$, $AlCl_3$, $AlBr_3$ or $FeCl_3$; and said another powder (iii) is carbon powder, BN, TiN, SiC, or $Si_3N_4$.

26. The method of synthesizing aluminum nitride as claimed in claim 24 wherein said additive is 0.01~100% by weight of the initiator, and said layer of said initiator has a thickness of 1~10 mm.

27. The method of synthesizing aluminum nitride as claimed in claim 26 wherein the additive is 0.05~60% by weight of said initiator, and said layer of said initiator has a thickness of 2~5 mm.

28. The method of synthesizing aluminum nitride as claimed in claim 1 wherein Step (b) comprises placing the loaded refractory container in a chamber, vacuuming said chamber, and introducing nitrogen gas into said vacuumed chamber.

29. The method of synthesizing aluminum nitride as claimed in claim 28 wherein said chamber has a nitrogen pressure of 0.1~30 atm after said introducing of nitrogen gas.

30. The method of synthesizing aluminum nitride as claimed in claim 28 wherein said chamber has a nitrogen pressure of 0.5~5 atm after said introducing of nitrogen gas.

31. The method of synthesizing aluminum nitride as claimed in claim 1 further comprising, at the same time of loading the raw material powder into the refractory container in Step (a), loading an aluminum nitride powder into said refractory container such that a layer of aluminum nitride powder is formed between said raw material powder and an inner wall of the refractory container.

32. The method of synthesizing aluminum nitride as claimed in claim 1 wherein Step (d) comprises connecting an electric power source to a electrical heater near to said raw material powder or said layer of said initiator in said refractory container.

33. The method of synthesizing aluminum nitride as claimed in claim 1 wherein Step (d) comprises irradiating a top of said raw material powder or said layer of said initiator in said refractory container with a laser, a microwave, or an IR light.

* * * * *